US010169349B2

(12) United States Patent
Crowe

(10) Patent No.: US 10,169,349 B2
(45) Date of Patent: Jan. 1, 2019

(54) LIBRARY INDEXING SYSTEM AND METHOD

(71) Applicant: SMITH SECKMAN REID, INC., Nashville, TN (US)

(72) Inventor: Joseph Patrick Crowe, Nashville, TN (US)

( * ) Notice: Subject to any disclaimer, the term of this patent is extended or adjusted under 35 U.S.C. 154(b) by 569 days.

(21) Appl. No.: 14/478,145

(22) Filed: Sep. 5, 2014

(65) Prior Publication Data

US 2015/0066945 A1    Mar. 5, 2015

Related U.S. Application Data

(60) Provisional application No. 61/874,332, filed on Sep. 5, 2013.

(51) Int. Cl.
*G06F 17/30* (2006.01)
(52) U.S. Cl.
CPC .. *G06F 17/30091* (2013.01); *G06F 17/30011* (2013.01)
(58) Field of Classification Search
CPC ............. G06F 17/30091; G06F 17/30011
See application file for complete search history.

(56) References Cited

U.S. PATENT DOCUMENTS

| | | | |
|---|---|---|---|
| 6,675,161 B1* | 6/2004 | Suchter | G06F 17/30 |
| 6,964,013 B1* | 11/2005 | Ono | G06F 17/2235 707/999.1 |
| 2008/0084573 A1 | 4/2008 | Horowitz et al. | |
| 2009/0067008 A1* | 3/2009 | Kodimer | H04N 1/00244 358/402 |
| 2010/0138458 A1* | 6/2010 | Liljefelt | G11B 27/105 707/812 |
| 2012/0330944 A1 | 12/2012 | Vailaya et al. | |
| 2013/0061182 A1 | 3/2013 | Weise et al. | |
| 2013/0173606 A1 | 7/2013 | Pasumarthi et al. | |
| 2014/0180797 A1* | 6/2014 | Joslin | G06K 9/00449 705/14.45 |

OTHER PUBLICATIONS

Adobe Systems Incorporated, "PDF Reference", Version 1.7, Nov. 2006, 1310 pages.*
International Search Report, PCT/US14/54212 (Smith Seckman Reid, Inc.), international filed Sep. 5, 2014.

* cited by examiner

*Primary Examiner* — Loc Tran
(74) *Attorney, Agent, or Firm* — Wayne Edward Ramage; Baker Donelson

(57) ABSTRACT

A system and method for collectively indexing a collection of documents in paper or electronic form. The collective index is created for all documents, which may come from a variety of sources and be initially presented in a variety of formats. Documents are converted to a standard electronic format, then analyzed and processed to identify, locate, and tag objects of interest. Hierarchical menus are created with multiple categories.

7 Claims, 23 Drawing Sheets

| Air Handling Unit 202 | Tag 204 | Drawings | Floor Plan | Detail | Schedule | Controls | HW Coil | CHW Coil | Humidifier Detail | Air Flow Diagram | Control Sequence |
|---|---|---|---|---|---|---|---|---|---|---|---|
| AHU-DT-10-01 | DT1001 | | | | | | | | | | |
| AHU-DT-10-02 | DT1002 | | | | | | | | | | |
| AHU-DT-10-03 | DT1003 | | | | | | | | | | |
| AHU-DT-10-04 | DT1004 | | | | | | | | | | |
| AHU-DT-10-05 | DT1005 | | | | | | | | | | |
| AHU-SUR-10-01 | SUR1001 | | | | | | | | | | |
| AHU-SUR-10-02 | SUR1002 | | | | | | | | | | |
| AHU-SUR-10-03 | SUR1003 | | | | | | | | | | |
| AHU-SUR-10-04 | SUR1004 | | | | | | | | | | |
| AHU-SUR-10-05 | SUR1005 | | | | | | | | | | |
| AHU-SUR-10-06 | SUR1006 | | | | | | | | | | |
| AHU-ED-10-01 | ED1001 | | | | | | | | | | |
| AHU-ED-10-02 | ED1002 | | | | | | | | | | |
| AHU-LAB-10-01 | LAB1001 | | | | | | | | | | |
| AHU-LAB-10-02 | LAB1002 | | | | | | | | | | |
| AHU-MS-10-01 | MS1001 | | | | | | | | | | |
| AHU-MS-10-02 | MS1002 | | | | | | | | | | |
| AHU-MS-10-03 | MS1003 | | | | | | | | | | |
| AHU-MS-10-04 | MS1004 | | | | | | | | | | |
| AHU-ICU-10-01 | ICU1001 | | | | | | | | | | |
| AHU-ICU-10-02 | ICU1002 | | | | | | | | | | |
| AHU-ICU-10-03 | ICU1003 | | | | | | | | | | |

| Air Handling Unit 202 | Tag 204 | Drawings 210 Mech Drawings 212 | Floor Plan | Detail | Schedule | Controls | HW Coil | CHW Coil | Humidifier Detail | Air Flow Diagram | Control Sequence |
|---|---|---|---|---|---|---|---|---|---|---|---|
| | | | FLOOR | DETAIL | SCHED | CONT | DETAIL | DETAIL | DETAIL | FLOW | SEQ |
| AHU-DT-10-01 | DT1001 | | | | | | | | | | |
| AHU-DT-10-02 | DT1002 | | | | | | | | | | |
| AHU-DT-10-03 | DT1003 | | | | | | | | | | |
| AHU-DT-10-04 | DT1004 | | | | | | | | | | |
| AHU-DT-10-05 | DT1005 | | | | | | | | | | |
| AHU-SUR-10-01 | SUR1001 | | | | | | | | | | |
| AHU-SUR-10-02 | SUR1002 | | | | | | | | | | |
| AHU-SUR-10-03 | SUR1003 | | | | | | | | | | |
| AHU-SUR-10-04 | SUR1004 | | | | | | | | | | |
| AHU-SUR-10-05 | SUR1005 | | | | | | | | | | |
| AHU-SUR-10-06 | SUR1006 | | | | | | | | | | |
| AHU-ED-10-01 | ED1001 | | | | | | | | | | |
| AHU-ED-10-02 | ED1002 | | | | | | | | | | |
| AHU-LAB-10-01 | LAB1001 | | | | | | | | | | |
| AHU-LAB-10-02 | LAB1002 | | | | | | | | | | |
| AHU-MS-10-01 | MS1001 | | | | | | | | | | |
| AHU-MS-10-02 | MS1002 | | | | | | | | | | |
| AHU-MS-10-03 | MS1003 | | | | | | | | | | |
| AHU-MS-10-04 | MS1004 | | | | | | | | | | |

Air Handling Units 600

| AHU-DT-10-01 | DT1001 |
| AHU-DT-10-02 | DT1002 |
| AHU-DT-10-03 | DT1003 |
| AHU-DT-10-04 | DT1004 |
| AHU-DT-10-05 | DT1005 |
| AHU-SUR-10-01 | SUR1001 |
| AHU-SUR-10-02 | SUR1002 |
| AHU-SUR-10-03 | SUR1003 |
| AHU-SUR-10-04 | SUR1004 |
| AHU-SUR-10-05 | SUR1005 |
| AHU-SUR-10-06 | SUR1006 |
| AHU-ED-10-01 | ED1001 |
| AHU-ED-10-02 | ED1002 |
| AHU-LAB-10-01 | LAB1001 |
| AHU-LAB-10-02 | LAB1002 |
| AHU-MS-10-01 | MS1001 |
| AHU-MS-10-02 | MS1002 |
| AHU-MS-10-03 | MS1003 |
| AHU-MS-10-04 | MS1004 |

202  204

| AHU-MS-10-04 | MS1004 |
| AHU-ICU-10-01 | ICU1001 |
| AHU-ICU-10-02 | ICU1002 |
| AHU-ICU-10-03 | ICU1003 |
| AHU-ICU-10-04 | ICU1004 |
| AHU-ICU-10-05 | ICU1005 |
| AHU-ICU-10-06 | ICU1006 |
| AHU-HM-10-01 | HM1001 |
| AHU-HM-10-02 | HM1002 |
| AHU-KT-10-01 | KT1001 |
| AHU-SG-10-01 | SG1001 |
| AHU-HPS-23-01 | HPS2301 |
| AHU-CHW-23-01 | CHW2301 |

| Home Menu | Mechanical | | | | | | Electrical | | | Fire Protection | | Medical Gas | | | |
|---|---|---|---|---|---|---|---|---|---|---|---|---|---|---|---|
| | Air Handling Units | High Density Cooling Units | Exhaust Fans | Fan Coil Units | Steam Humidifiers | Cabinet Unit Heaters | Transformers | Distribution Panels | Automatic Transfer Switches | Generators | Fire Pump | Jockey Pump | Air Compressors | Vacuum Pumps | Manifolds |

610 — Home Menu
612 — (category row)
600

FIG. 9

Mechanical Equipment

Training Videos: Air Conditioning Units, Exhaust Fans, Unit Heaters, Hydronic Pumps, Plate and Frame Heat Exchangers, Steam PRVs, Infrared Heaters, Steam-to-Water Converters

Commissioning: Packaged AHUs, Ceiling Supply Fans, Fan Coil Units, Cooling Towers, Air Separators, Condensate Pumps, Fuel Oil Pumps, Electric Heaters

Drawings: Air Handling Units, High Density Cooling Units, Air Curtains, Chillers, Expansion Tanks, Steam Boiler and Steam Equipment, Cabinet Unit Heaters, Booster Humidifiers

LIBRARY INDEXING SYSTEM AND METHOD

This application claims benefit of and priority to U.S. Provisional Application No. 61/874,332, filed Sep. 5, 2013, by Joseph Crowe, et al., and is entitled to that filing date for priority. The specification, figures and complete disclosure of U.S. Provisional Application No. 61/874,332 are incorporated herein by specific reference for all purposes.

FIELD OF INVENTION

This invention relates to a system and related methods for indexing a collection of documents in paper or electronic form and creating an intuitive menu structure therefor.

BACKGROUND OF INVENTION

A typical business or commercial enterprise will possess a host of documents in paper or electronic form from a variety of sources. While each may be independently indexed, the documents as a whole are not, thus making it difficult to locate needed reference material quickly and efficiently.

SUMMARY OF INVENTION

In various embodiments, the present invention comprises a computer assisted system and related methods for indexing a collection of documents in paper or electronic form and creating an intuitive menu structure therefor. The collective index is created for all documents, which may come from a variety of sources and be initially presented in a variety of formats.

Initially all documents, papers and data are collected. Electronic form documents are converted to a common standard format (such as PDF), if they are not already in that format. Paper documents are converted to that same common standard format by means known in the art. In one exemplary embodiment, all of the documents in standard format (e.g., PDF) representing the pertinent subject matter to be indexed are placed in a single work or file folder on a storage device (e.g., hard drive) on a computer or server device.

Each document is then analyzed and processed. All buttons and destinations in a document are mapped out. In several embodiments, the processing comprises the creation of a spreadsheet for each type of object of interest. In this embodiment, the left-hand column represents a list or collection of names or titles for each individual object of interest of a certain type (e.g., names of air handling units). The second column contains a unique identifier tag (e.g., an alpha-numeric code) for each named object of interest. Other columns in the spreadsheet represent a combination of the different types of information available for each object of interest and the file locations where that information can be found. While this exemplary embodiment of the invention uses a spreadsheet, it should be noted that any similar form of data file or program type used for storing information can be used.

Each document file is reviewed and searched to find subject matter pertinent to the objects of interest. When a piece of information relative to any object of interest is located within a document, the exact view of the information is marked with a unique identifier tag. While the unique identifier tag can be in any form, in one embodiment, the unique identifier tag is a two-part alpha-numeric string denoting a combination of the object of interest (e.g., Air Handling Unit), and the kind of information pertaining to the object of interest (e.g., drawing plan view of the unit), with an underscore character used to separate the parts. The page view best representing the floor plan view of an air handling unit named "AHU-DT-10-01" thus would receive the unique identifier tag of "FLOOR_DT1001." A "destination" is added to the PDF document file with that unique identifier tag in the list of destinations within the document, thus representing the location and view of that information within the PDF document file.

After a destination is added to the list of destinations in the PDF document, it is marked on the spreadsheet, within the row representing the named object of interest, and with the column representing the PDF file name where the designation resides (e.g., "Mech Drawings.pdf"), the type of information the destination is marking (e.g., "Floor Plan"), or both.

This process is completed for each object of interest in the spreadsheet assigned by type until all PDF documents have been thoroughly searched, analyzed, and provided with destinations. The spreadsheets are simultaneously updated to reflect the destinations created with the PDF documents. If an object of interest was depicted within the PDF documentation, it is overlaid with an invisible button or link. The button/link is named after the unique identifier tag of that object of interest. These buttons/links are provided with Javascript (or similar coding) based on the information within the corresponding spreadsheet.

After completion of the processing of all documents, the process proceeds to conceptual menu construction. It should be noted that code construction can be performed simultaneously with conceptual menu construction. For conceptual menu construction, all objects of interest cataloged in the spreadsheets described above are now organized by type, using name and unique identifier tag, into a simple columnar list format in multiple type spreadsheets. Each type is given a title, which may be placed at the top of the list of objects of interest for that type (e.g., "Air Handling Units"). This title is subsequently used for the menu title for a menu representing the type, and for each object of interest belonging to this type, there is a name and unique identifier tag provided below the title.

Each type is then assigned to a category (a collection of similar types). In a process similar to that described above for types, each category is given a name, and a category spreadsheet is generated where all types and categories are listed under higher level categories. This process is repeated for all categories in the spreadsheet until one final level category is reached (above all sub-categories and their types). In one exemplary embodiment, the end result is a spreadsheet where each row represents a category or a type of object of interest, and each column indicates the level of the category. The process allows for many levels of sub-categories between the highest-level category (e.g., "Home Menu") and the types of objects of interest. Each sub-category belongs to the nearest higher-level category above it and each type of object of interest belongs to the sub-category above it.

The menu category spreadsheet file may be reviewed to ensure that every category or sub-category falls within a higher level category up to the top level, and that each type of object of interest belongs to the lowest level of category. Then the spreadsheets cataloging the objects of interest are reviewed to ensure that all objects of interest belong to a category listed in the menu spreadsheet file.

The process then proceeds to menu face construction, which generates the object of interest menus. In one exemplary embodiment, a Visual Basic macro is executed on each spreadsheet cataloging the objects of interest to examine the quantity of objects of interest, and determine the best layout for the objects to be displayed as buttons in a menu. It then creates a menu for the type of the group, and each object of interest within it is represented by a button. In one embodiment, the type of menu created is a PowerPoint menu. The title for each object of interest menu is taken from the title given to the objects of interest list, and the object of interest names are applied to individual buttons. The number of buttons in the menu is automatically determined and placed depending on the total number of objects of interest to be included in the menu.

The menu category spreadsheet file undergoes a similar process to create the Home Menu and the various category and sub-category menus. The process (which can be executed through a Visual Basic macro, or other similar program) examines the quantity of sub-categories for each higher-level category, and determines the best layout for the objects to be displayed as menu buttons. It then creates a menu (such as a PowerPoint type menu) for each category, where the menu title is the category name, and each button represents one of the sub-categories for that category.

Once the basic menu faces are constructed for all category and type menus, the menus are then completed. In one exemplary embodiment, where the document files are in PDF format, the completion process generates PDF menus using the basic menu faces. A Visual Basic macro (or other similar program) opens each PowerPoint menu, generates an identical PDF menu, and uses the unique identifier tag information from the button in each PowerPoint file to overlay the PDF with buttons in the same arrangement, with each button tagged by its unique identifier tag. The buttons correlate with objects of interest, and the button for each object of interest is named after its tag. The identifier tag can be used to reference the information providing in the spreadsheets cataloging the objects of interest generated earlier.

The system similarly generates a PDF menu for each category and sub-category menu face, with the PDF overlain with buttons in the same arrangement. Each button is named the same as it was named in the PowerPoint file, with a .pdf suffix added.

Separate from the menu construction process, the system proceeds with constructing code text files. This construction can be performed simultaneously with menu construction. Code text file construction uses the object of interest spreadsheet file for each type, where all objects of interest have been associated with relevant document files (e.g., PDF document files), and the locations within those files. A macro program (such as a Visual Basic macro program) is executed on each of these type spreadsheet files, and generates a text file for each object of interest based on the information provided for that object (i.e., the information provided in that object's row), wherein the text in the file is in the form of code. In one embodiment, the macro program arranges the information from the spreadsheet row into a Javascript code format which can be placed into PDF files. Each text file is named after the unique identifier tag for its object of interest. The text files, each representing an object of interest with "pointers" to important locations within the original collection of PDF documents, may be collected in a single folder. For example, the text file "DT1001.txt" contains the Javascript which will be placed into relevant PDF files which have buttons or links with the "DT1001" tag (which corresponds to a "AHU-DT-10-01" air handling unit).

The code from the text files is then injected into relevant PDF files. In one embodiment, all of the PDF documents analyzed and all of the PDF menu files generated are placed into a common folder for ease of processing. A Visual Basic script (or other similar program) then processes a PDF document by opening it, and collecting a list of buttons and links available in the PDF. For each button or link, the process first determines whether the button or link is named after a document, or a unique identifier tag for an object (this is apparent by the button or link name). If the button/link is named after another document (e.g., "Air Handling Units.pdf"), the program generates a Javascript code for the button/link and inserts the code into the PDF document so that when the button/link is clicked (such as by an end-user), the code opens the document bearing the same name as the button/link. This is the case for all category PDF menus.

If the button/link is named after the unique identifier tag of an object of interest, the program searches the text files for a file name bearing the unique identifier tag. If a match is found, the text file is opened and the Javascript code is copied from it and placed within the PDF document. When a user clicks the button/link, a pop-up menu is presented showing options that can guide the user to various destinations. The unique identifier tags exist within both the PDF menus and the original PDF document files.

The present invention also comprises a code-verification phase. In one embodiment, a Visual Basic script (or similar program) is executed on each PDF file. The program compiles a list of each filename as well as each button and destination within that file. It then opens each type spreadsheet representing each object of interest, and verifies that each data point shown on the spreadsheet is accurately associated with the buttons and destinations list collected from the PDFs. Any points which do not have a match are marked in some way (e.g., highlighted, or with a different color), for easy detection. Mismatched points can then be corrected either in the spreadsheet or in the PDF documents by re-executing the appropriate steps.

The complete library of PDF documents and menus can then be stored on one or more single computer storage devices (e.g., external disk drive, computer hard drive, portable drive, USB drive, or the like), and provided to end-users. The end-user can initiate the menu file and proceed through the menus to find the information needed, then click on the appropriate link or button to go to that information in the original PDF document, wherever located.

DESCRIPTION OF THE DRAWINGS

FIG. 3 shows an example of an object of interest spreadsheet.

FIG. 5 shows another example of an object of interest spreadsheet.

FIG. 6 shows an example of a completed object of interest spreadsheet.

FIG. 8 shows an example of an object of interest list.

FIG. 9 shows an example of a category hierarchy.

FIG. 18 shows an example of a second-level category menu.

FIG. 22 shows an example of a pop-up window with menu.

FIG. 23 shows an example of a code-verification spreadsheet.

DETAILED DESCRIPTION OF EXEMPLARY EMBODIMENTS

Figure 1:
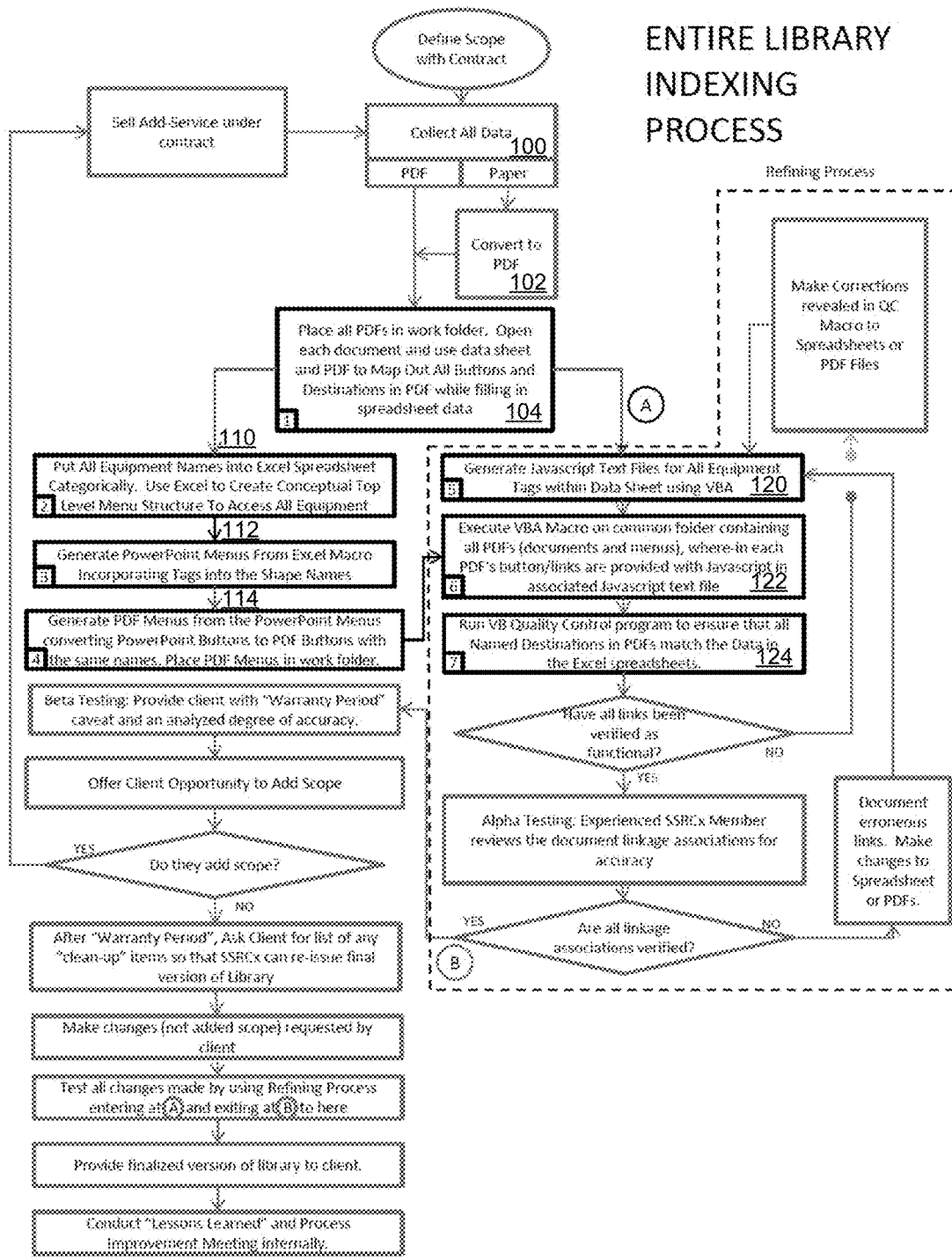
FIG. 1 shows a chart of a library indexing process in accordance with an exemplary embodiment of the present invention.
Figure 2:
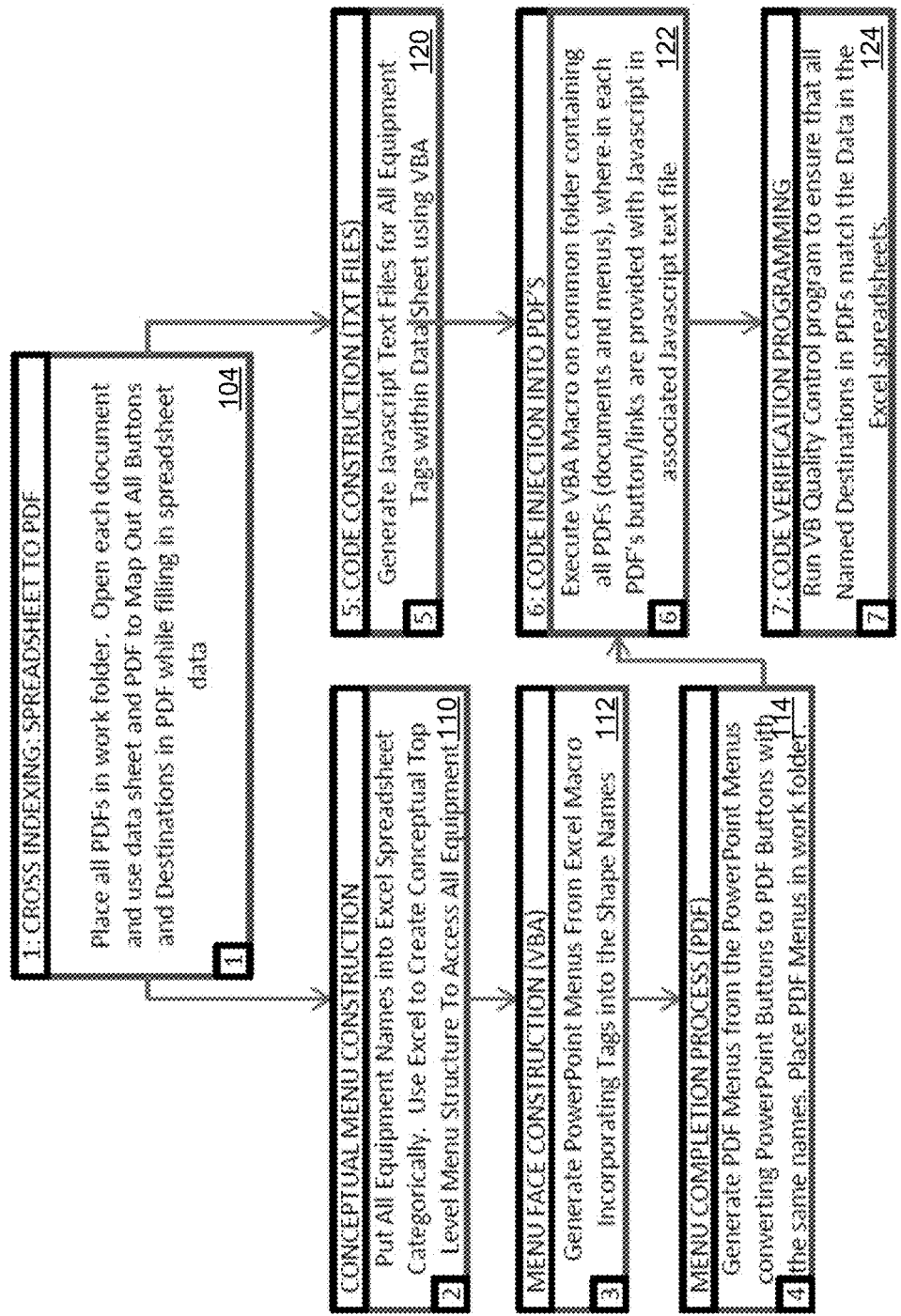
FIG. 2 shows a chart of a cross-indexing and menu construction process from FIG. 1.

In various embodiments, the present invention comprises a computer assisted system and related methods for indexing a collection of documents in paper or electronic form and creating an intuitive menu structure therefor. With reference to FIG. 1, initially all documents and data are collected 100. Electronic form documents are converted to a common standard format (such as PDF), if they are not already in that format. Paper documents are converted to that same format by means known in the art 102. In one exemplary embodiment, all of the documents in standard format (e.g., PDF) representing the pertinent subject matter to be indexed are placed in a single work or file folder on a storage device (e.g., hard drive) on a computer or server device. Each document is then analyzed and processed (Phase 1, as seen in FIG. 2). All buttons and destinations in a document are mapped out 104.

In several embodiments, the processing comprises the creation of a spreadsheet for each type of object of interest. An example of a spreadsheet for "Air Handling Units" 200 as the object of interest is shown in FIG. 3. In this embodiment, the left-hand column 202 represents a list or collection of names or titles for each individual object of interest of a certain type (e.g., names of air handling units). The second column 204 contains a unique object identifier tag (e.g., an alpha-numeric code) for each named object of interest. Other columns in the spreadsheet represent a combination of the different types of information available for each object of interest and the file locations where that information can be found. While this exemplary embodiment of the invention uses a spreadsheet, it should be noted that any similar form of data file or program type used for storing information can be used.

Figure 4:
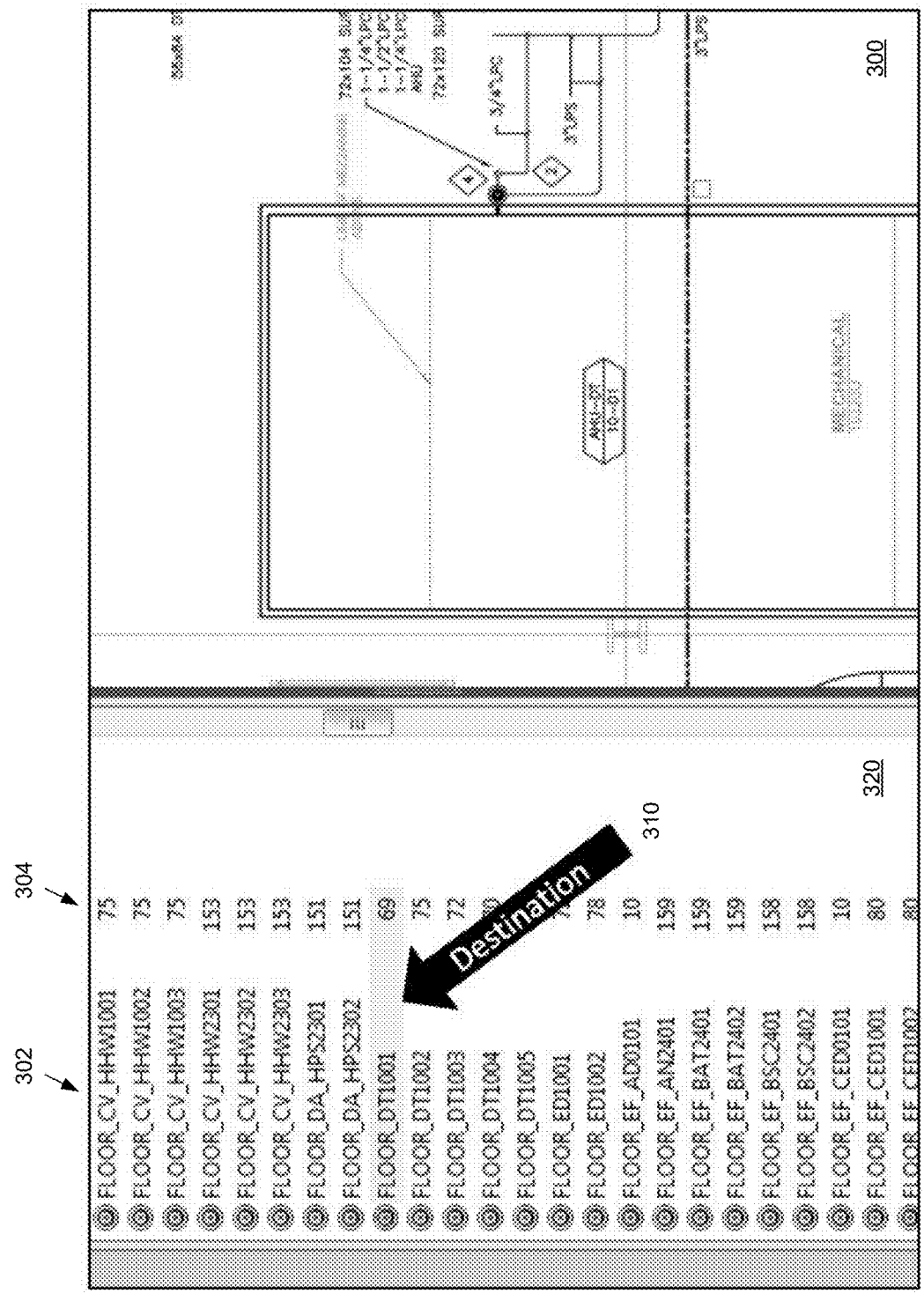
FIG. 4 shows a document file being analyzed.

Each document file is reviewed and searched to find subject matter pertinent to the objects of interest. FIG. 4 illustrates an example of the process where HVAC equipment is the general subject matter, so that any documents depicting the installation, operation, maintenance, repair, controls, or other pertinent information pertaining to HVAC equipment is cross-indexed (as described below). When a piece of information relative to any object of interest is located within a document, the exact view of the information 300 is marked with a unique identifier tag 302. While the unique identifier tag can be in any form, in the embodiment shown, the unique identifier tag is a two-part alpha-numeric string denoting a combination of the object of interest (e.g., Air Handling Unit), and the kind of information pertaining to the object of interest (e.g., drawing plan view of the unit), with an underscore character used to separate the parts. The page view 300 best representing the floor plan view of an air handling unit named "AHU-DT-10-01" thus would receive the unique identifier tag of "FLOOR_DT1001." A "destination" 310 is added to the PDF document file with that unique identifier tag in the list of destinations 320 within the document, thus representing the location 304 and view of that information within the PDF document file.

After a destination 310 is added to the list of destinations 320 in the PDF document, it is marked on the spreadsheet, as seen in FIG. 5, within the row representing the named object of interest and the column representing the PDF file name 210 where the designation resides (e.g., "Mech Drawings.pdf"), the type of information the destination is marking 212 (e.g., "Floor Plan"), or both.

Figure 6:
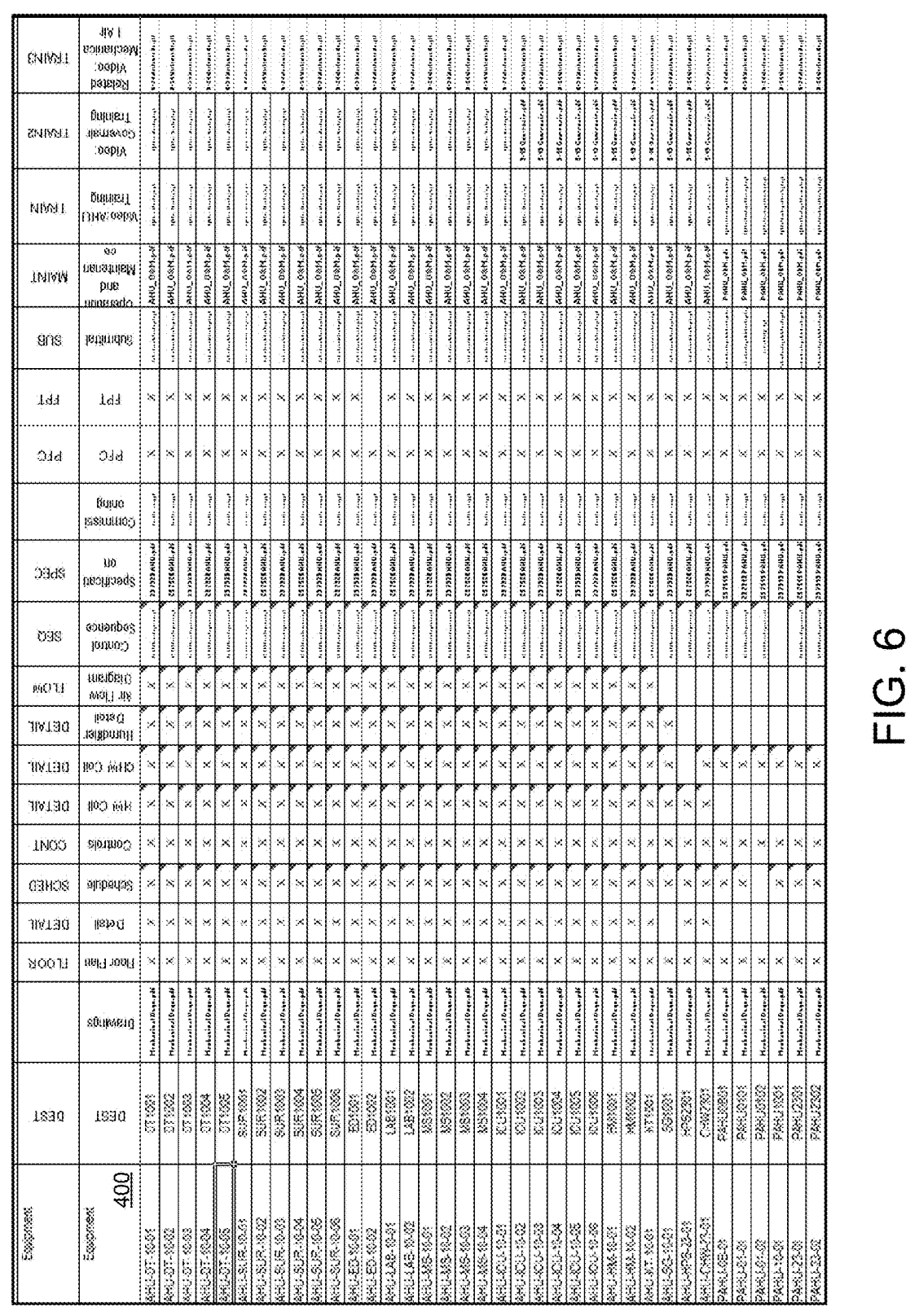

This process is completed for each object of interest in the spreadsheet assigned by type until all PDF documents have been thoroughly searched, analyzed, and provided with destinations. The spreadsheets are simultaneously updated to reflect the destinations created with the PDF documents. FIG. 6 shows an example of a complete spreadsheet, with all objects of interest of a certain type 400 (in this case, air handling units) associated with the relevant PDF document files and the locations within those documents.

Figure 7:
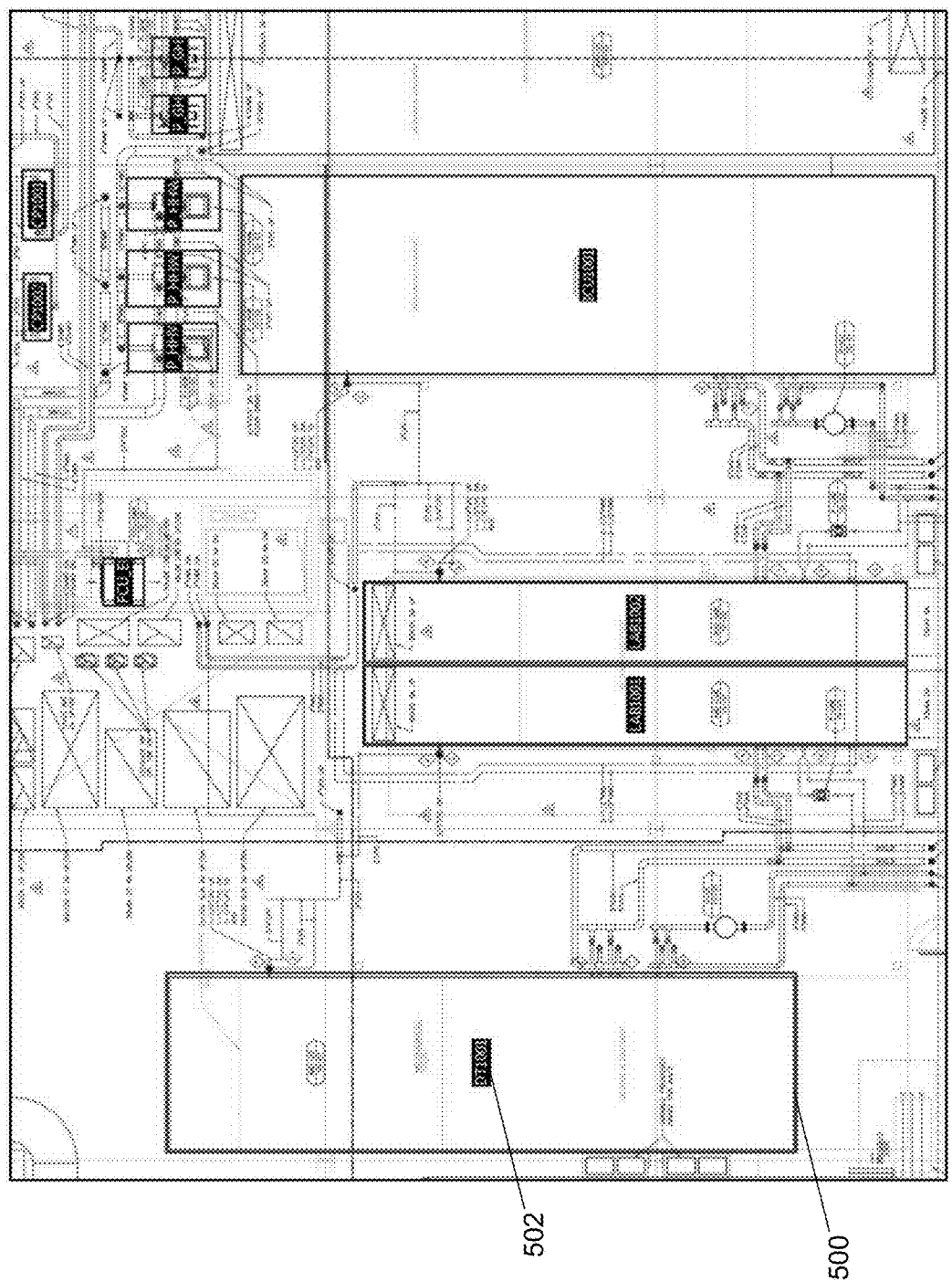
FIG. 7 shows an example of a button overlay in a document file.
Figure 10:
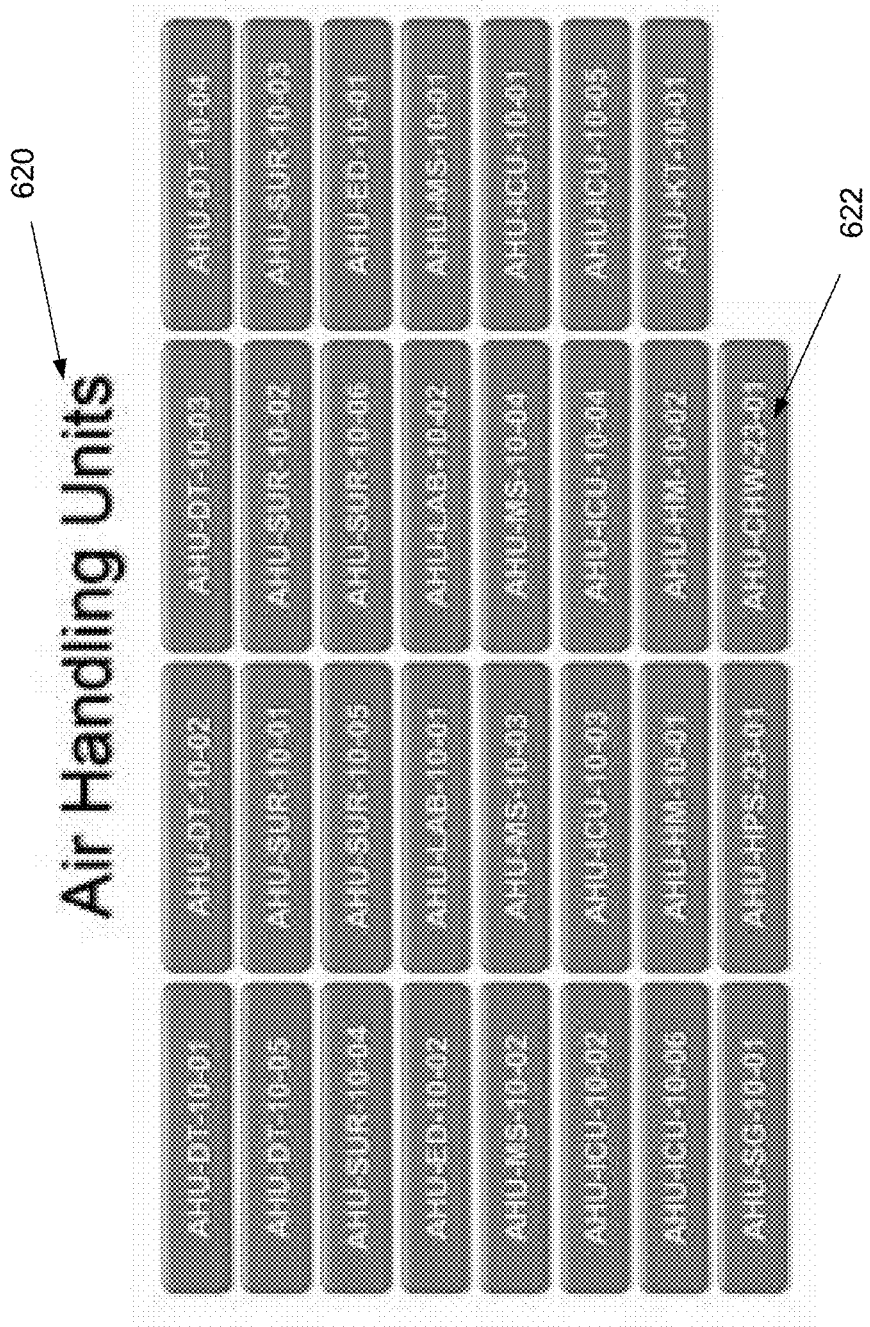
FIGS. 10-16 show examples of object of interest menus.
Figure 11:
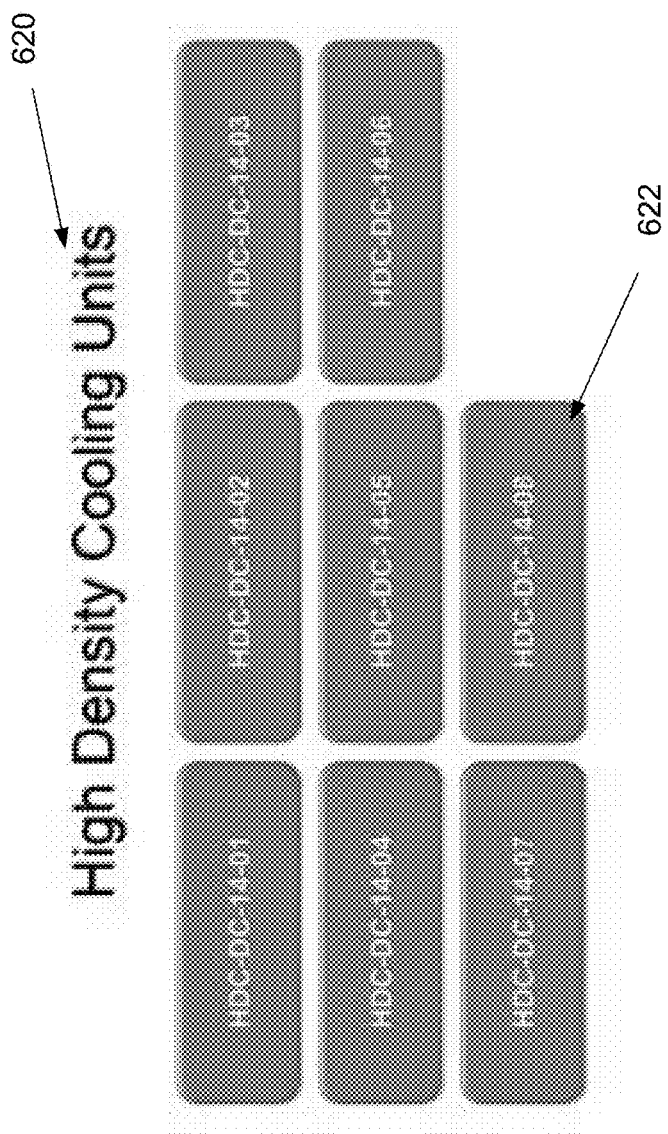
Figure 12:
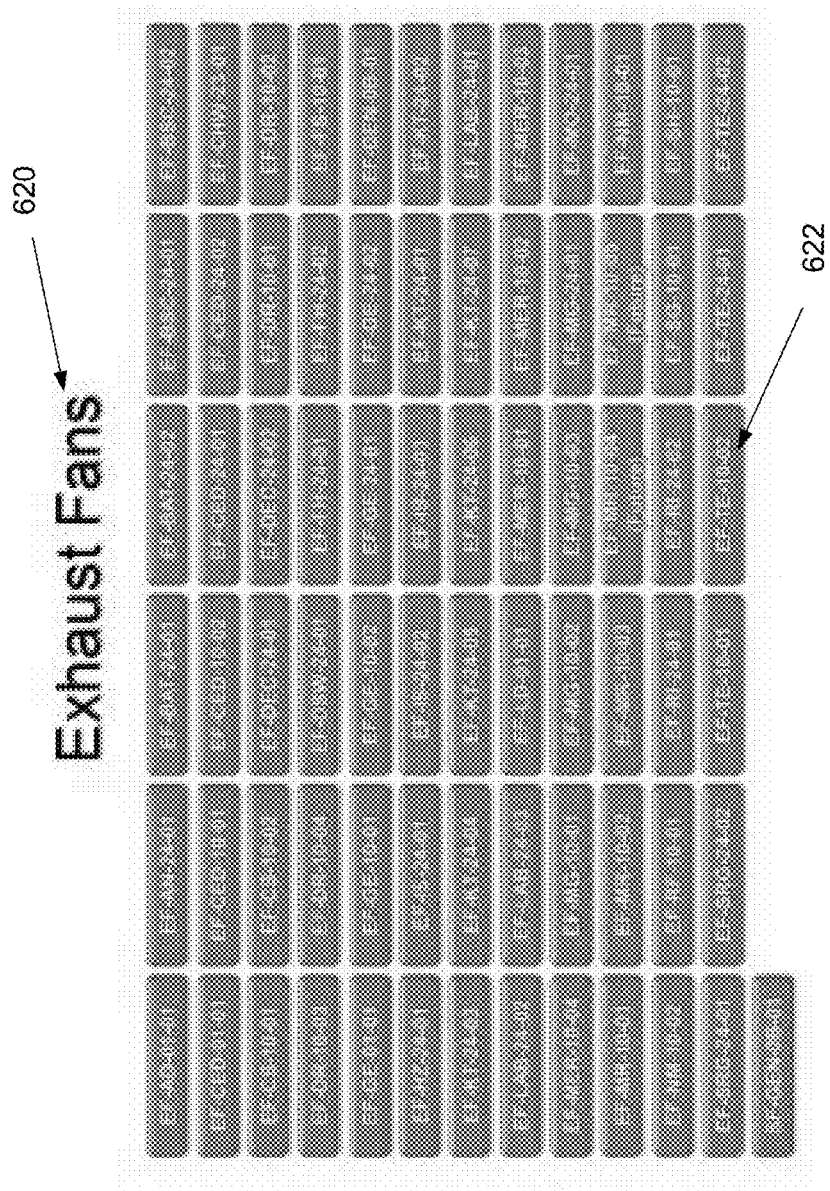
Figure 13:
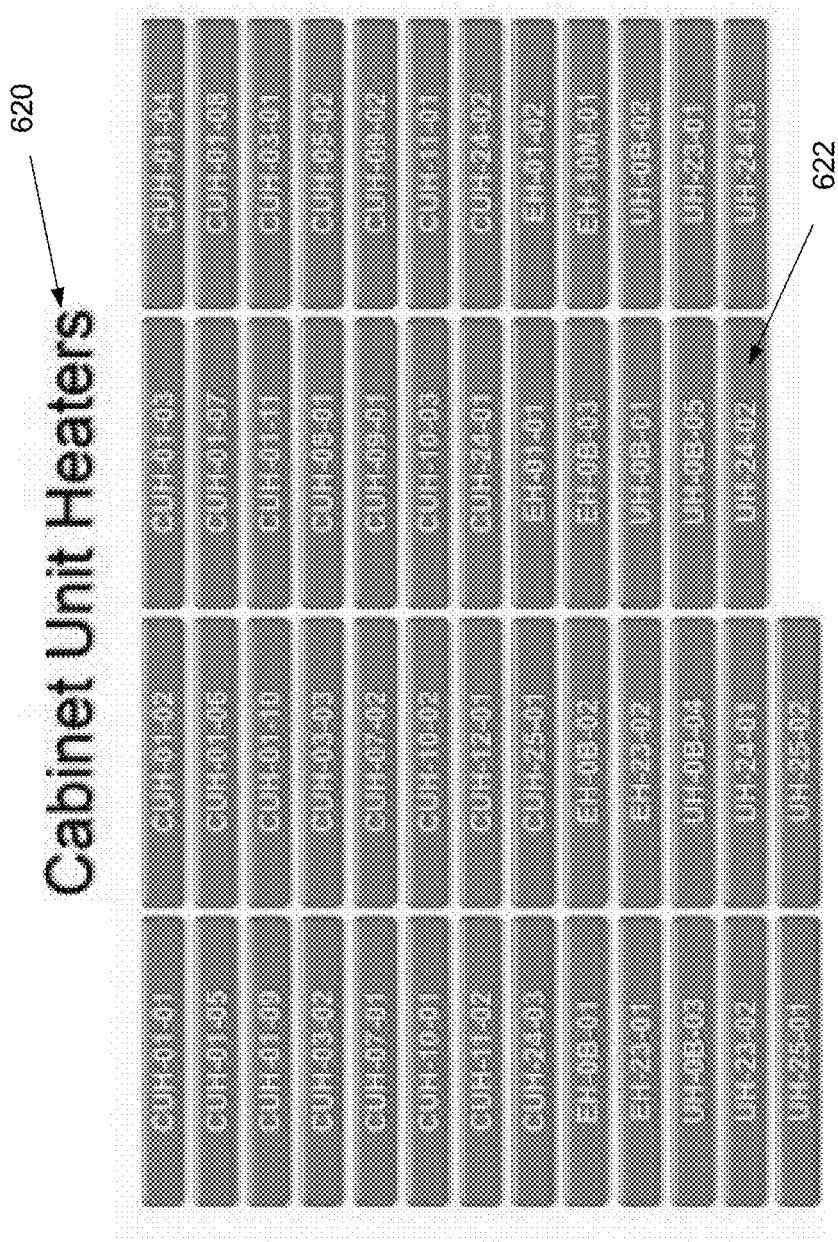
Figure 14:
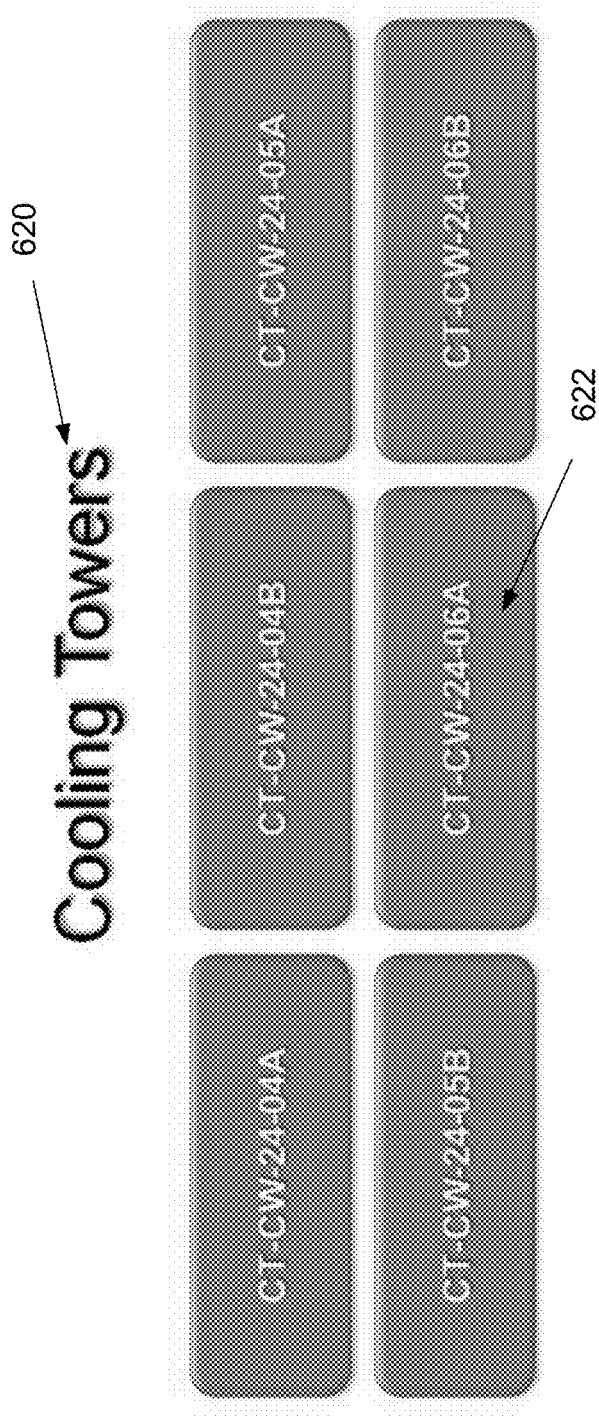
Figure 15:
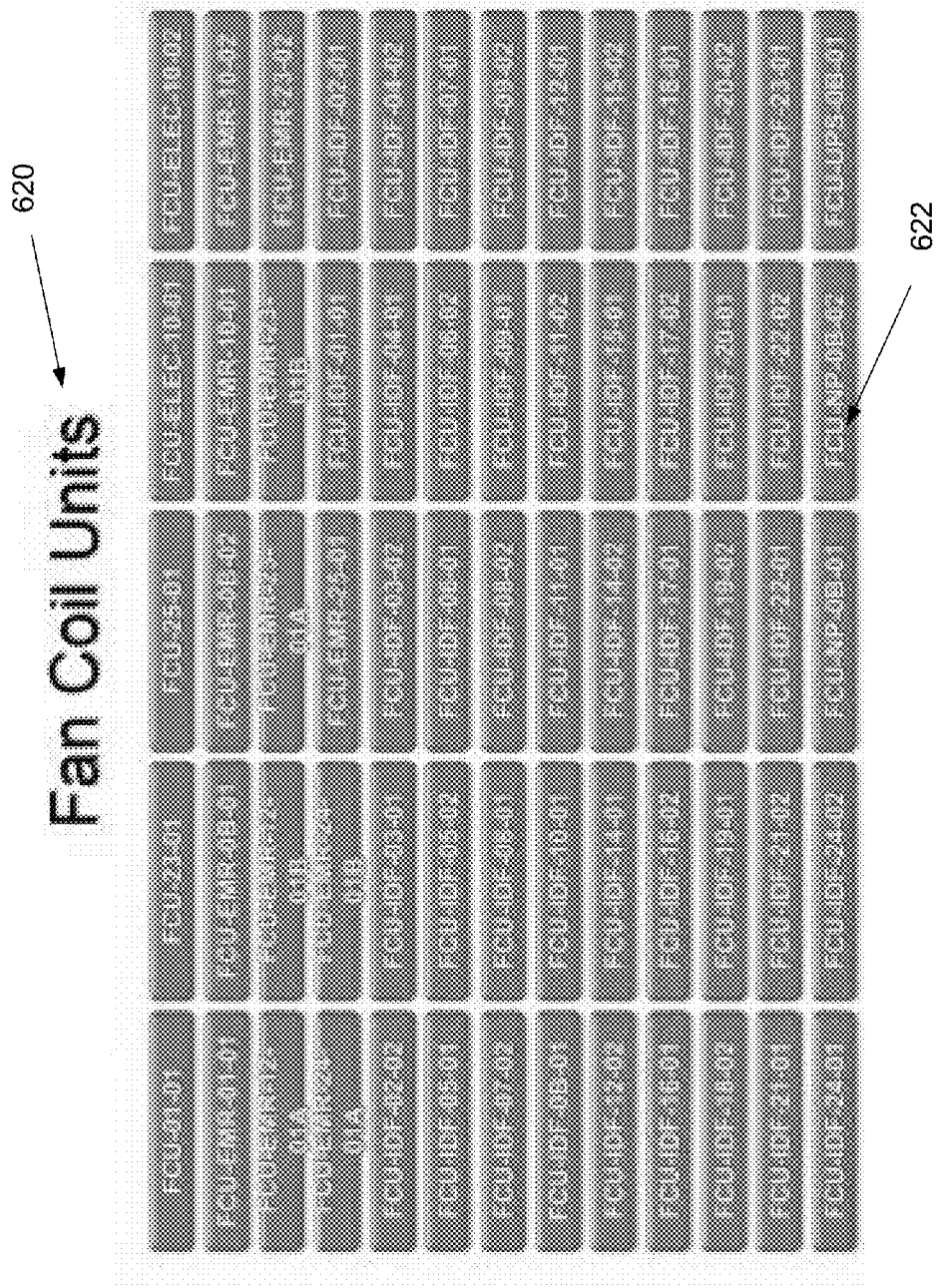
Figure 16:
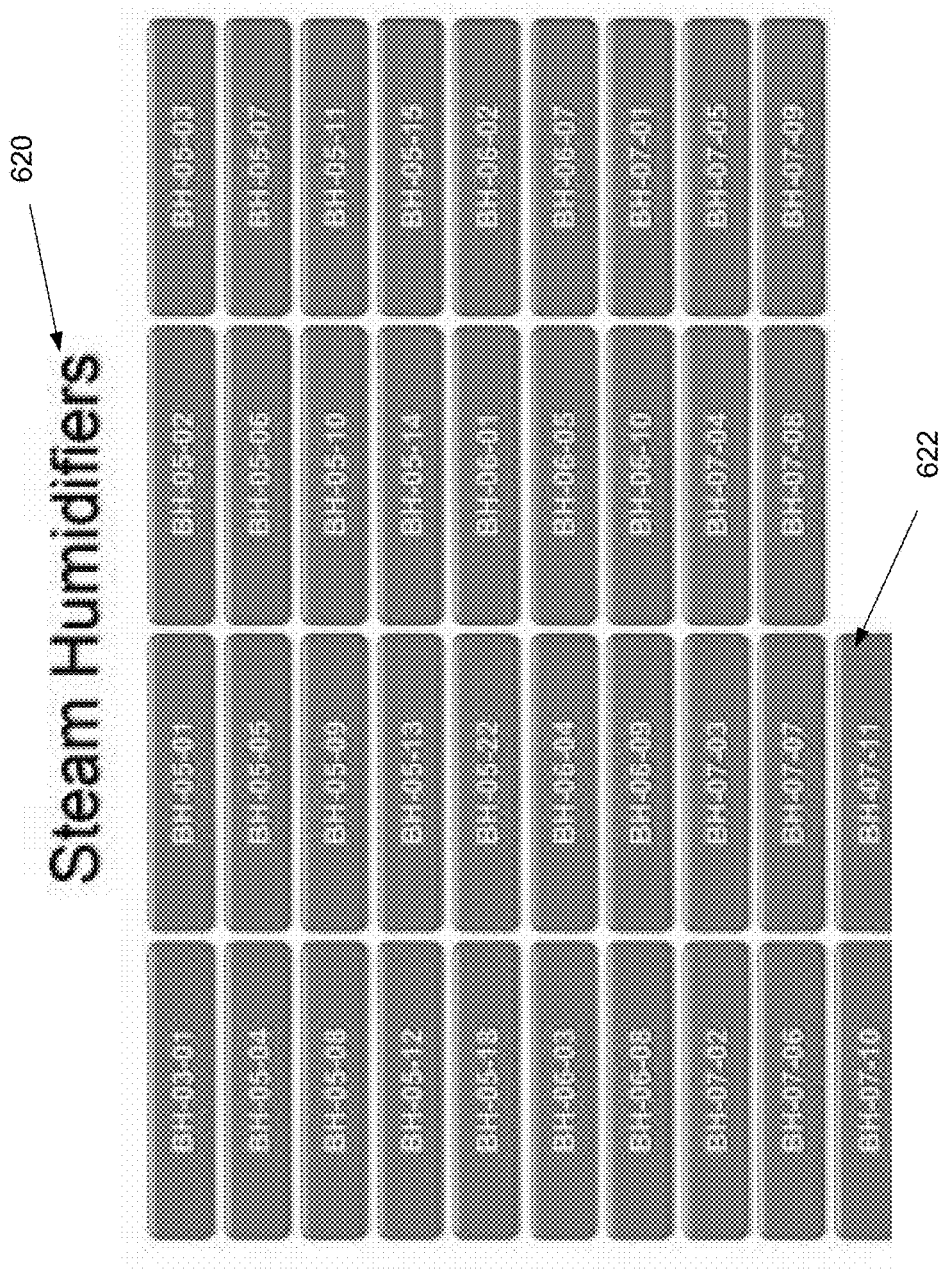

If an object of interest was depicted within the PDF documentation, it is overlaid in the document with an invisible button or link 500. The button/link is named 502 after the unique identifier tag of that object of interest, as seen in FIG. 7. As described later, these buttons/links are provided with Javascript (or similar coding) based on the information within the corresponding spreadsheet.

After completion of the processing of all documents (Phase 1), the process proceeds to conceptual menu construction 110 (Phase 2). It should be noted that code construction (Phase 5, described below) can be performed simultaneously with Phase 2.

For Phase 2, all objects of interest cataloged in the spreadsheets described above are now organized by type, using name and unique identifier tag, into a simple columnar list format in multiple type spreadsheets, as seen in FIG. 8. Each type is given a title 600, which in the embodiment shown is placed at the top of the list of objects of interest for that type (e.g., "Air Handling Units"). As described in more detail below, this title is subsequently used for the menu title for a menu representing the type, and for each object of interest belonging to this type, there is a name 202 and unique object identifier tag 204 provided below the title.

Each type is then assigned to a category (i.e., a collection of similar types). In a process similar to that described above for types, each category is given a name, and a category spreadsheet is generated where all types and categories are listed under higher level categories. This process is repeated for all categories in the spreadsheet until one final level category is reached (above all sub-categories and their types). In one exemplary embodiment, the end result is a spreadsheet where each row represents a category or a type of object of interest, and each column indicates the level of the category. FIG. 9 shows an example with one level of sub-categories; however, the process allows for many levels of sub-categories between the highest-level category (e.g., "Home Menu") and the types of objects of interest. Each sub-category belongs to the nearest higher-level category above it (i.e., to the left, in FIG. 9), and each type of object of interest belongs to the sub-category above it.

FIG. 9 shows an example with two category levels, and one type. The top category level 610 is named "Home Menu," and there is one sub-category level 612 with sub-categories "Mechanical," "Electrical," "Fire Protection," and "Medical Gas." Each sub-category has several types 600. Thus, the "Air Handling Units" type belong to the "Mechanical" sub-category, which belongs to the "Home Menu" final category.

The menu category spreadsheet file may be reviewed to ensure that every category or sub-category falls within a higher level category up to the top level, and that each type of object of interest belongs to the lowest level of category. Then the spreadsheets cataloging the objects of interest are reviewed to ensure that all objects of interest belong to a category listed in the menu spreadsheet file.

The process then proceeds to menu face construction 112 (Phase 3), which generates the object of interest menus. In one exemplary embodiment, a Visual Basic macro is executed on each spreadsheet cataloging the objects of interest to examine the quantity of objects of interest, and determine the best layout for the objects to be displayed as buttons in a menu. It then creates a menu for the type of the group, and each object of interest within it is represented by a button. In one embodiment, the type of menu created is a PowerPoint menu, as seen in FIGS. 10-16. The title 620 for each object of interest menu is taken from the title given to the objects of interest list (as seen in FIG. 8), and the object of interest names are applied to individual buttons 622 in the menu. The number of buttons in the menu is automatically determined and placed depending on the total number of objects of interest to be included in the menu.

The menu category spreadsheet file undergoes a similar process to create the Home Menu and the various category and sub-category menus. The process (which can be executed through a Visual Basic macro, or other similar program) examines the quantity of sub-categories for each higher-level category, and determines the best layout for the objects to be displayed as menu buttons. It then creates a menu (such as a PowerPoint type menu) for each category, where the menu title is the category name, and each button represents one of the sub-categories for that category.

Figure 17:
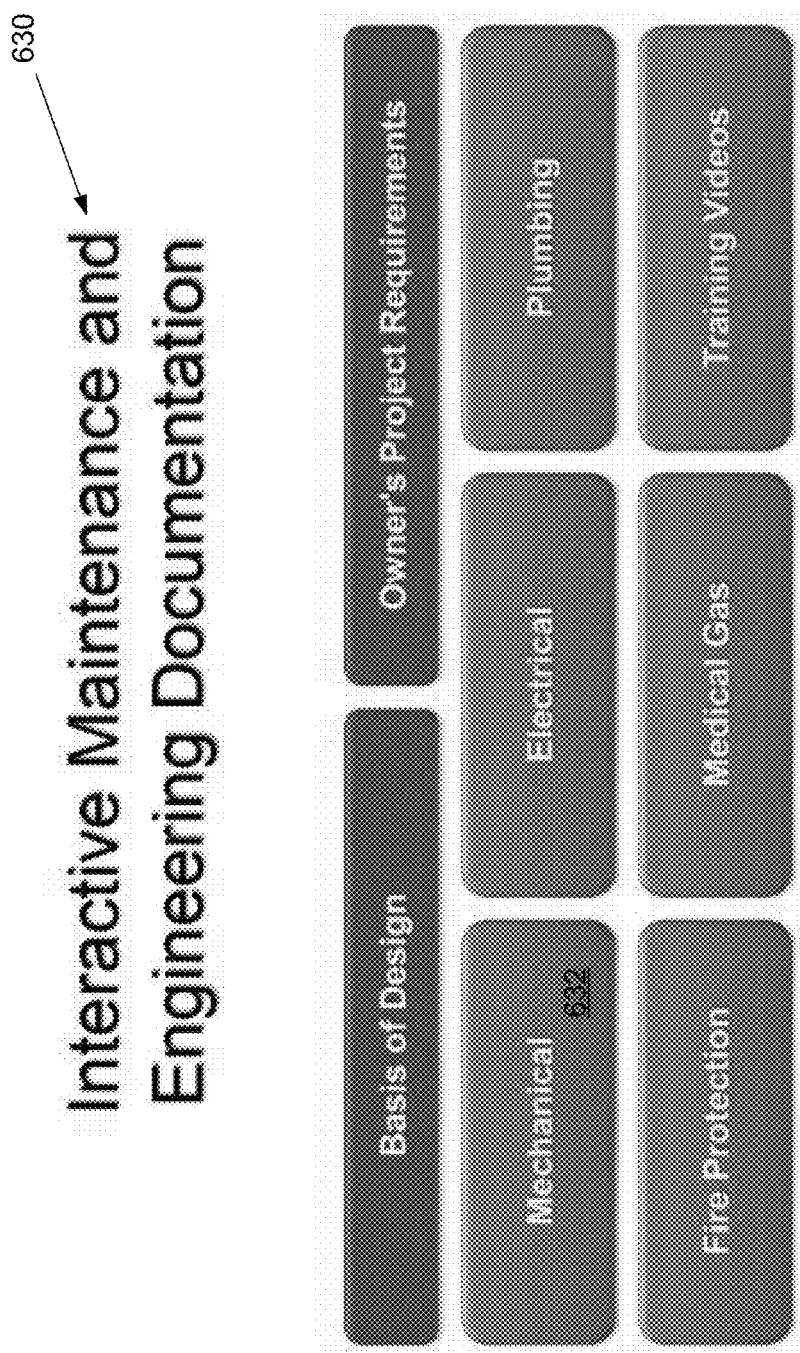
FIG. 17 shows an example of a top-level category menu.

FIG. 17 shows an example of a top-level category 610 "Home Menu" with the title "Interactive Maintenance and Engineering Documentation" 630. Several sub-categories are listed and shown as buttons. Once the menus are completed, using the "Mechanical" button 632 from this menu, for example, displays the second-level category menu for "Mechanical Equipment," as seen in FIG. 18, which contains buttons for the objects of interest menus (as described above).

Figure 19:
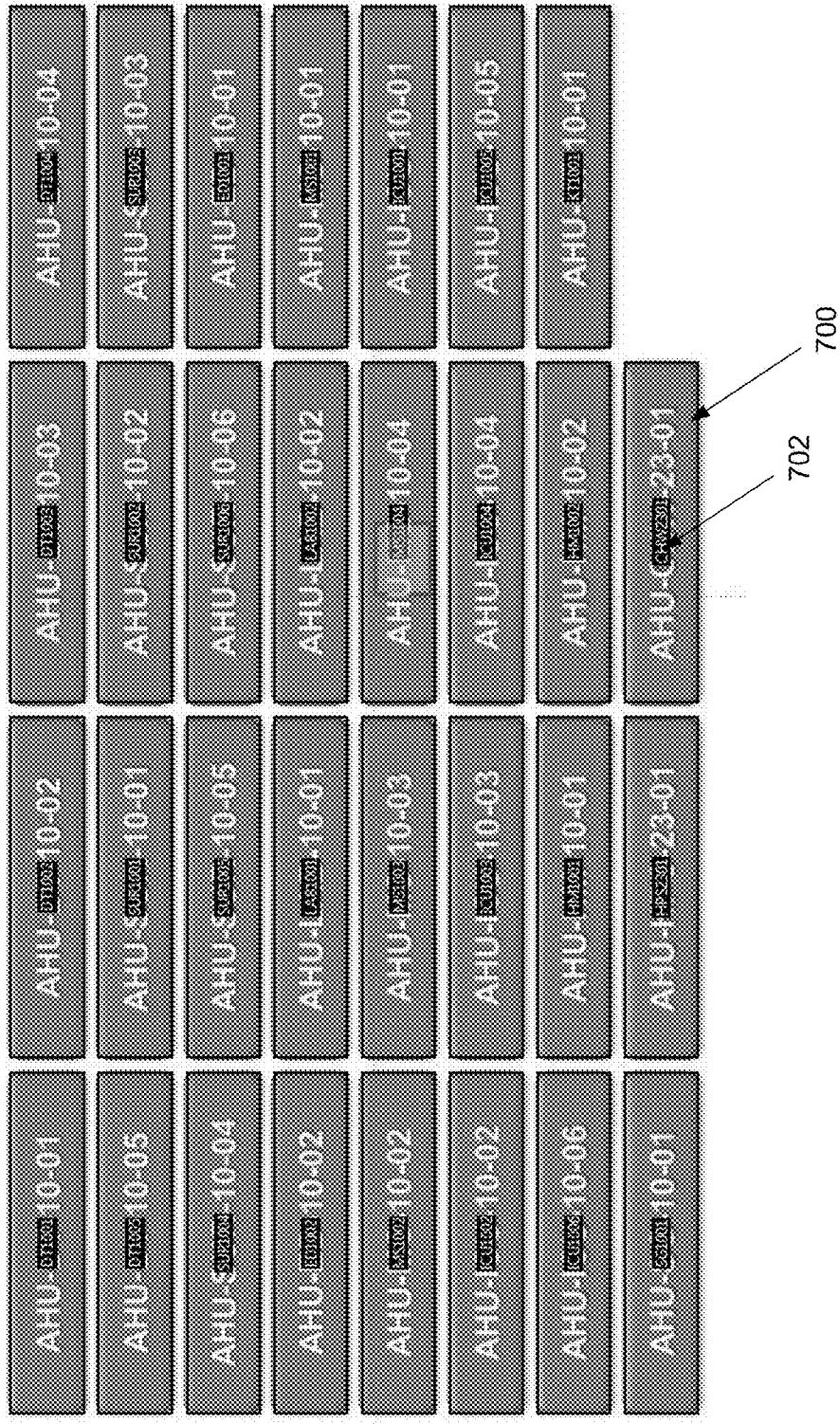
FIGS. 19-20 show examples of menus with identifier tag overlays.

Once the basic menu faces are constructed for all category and type menus (e.g., PowerPoint menus, in the examples shown), the menus are then completed by generating standard format menus 114 (Phase 4). In one exemplary embodiment, where the document files are in PDF format, the completion process generates PDF menus using the basic menu faces. A Visual Basic macro (or other similar program) opens each PowerPoint menu, generates an identical PDF menu, and uses the unique identifier tag information from the button in each PowerPoint file to overlay the PDF with buttons in the same arrangement, with each button 700 tagged by its unique identifier tag 702, as seen in FIG. 19. The buttons correlate with objects of interest, and the button for each object of interest is named after its tag. For example, the object of interest "AHU-DT-10-01" is overlain with a button named "DT1001." The identifier tag can be used to reference the information provided in the spreadsheets cataloging the objects of interest generated in Phase 1, as seen in FIG. 6.

Figure 20:
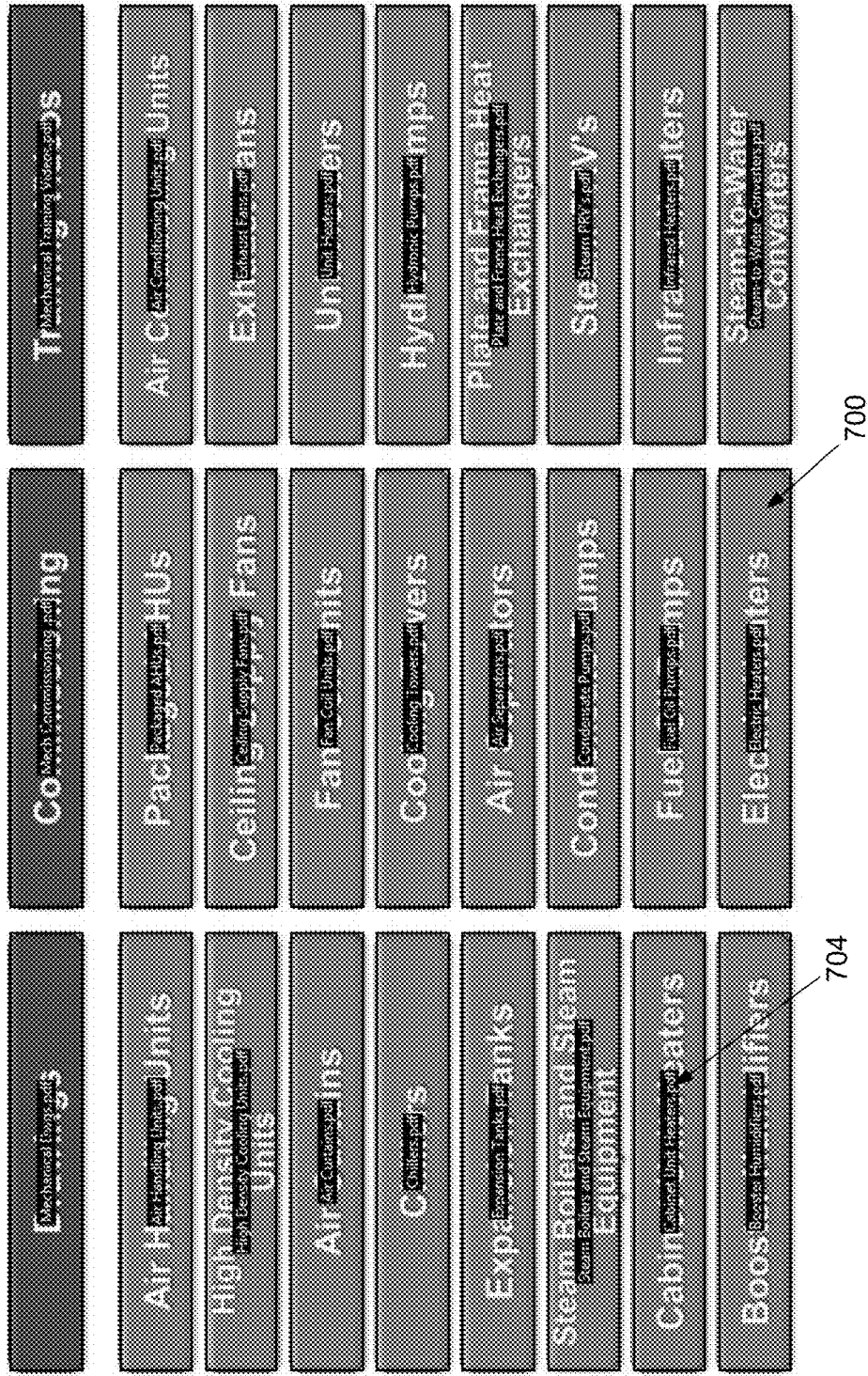

The system similarly generates a PDF menu for each category and sub-category menu face, with the PDF overlain with buttons 700 in the same arrangement, as seen in FIG. 20. Each button is tagged the same as it was named in the PowerPoint file, with a .pdf suffix added 704.

Separate from the menu construction process, the system proceeds with constructing code text files 120 (Phase 5). As noted above, Phase 5 can be performed simultaneously with Phases 2-4.

Figure 21:
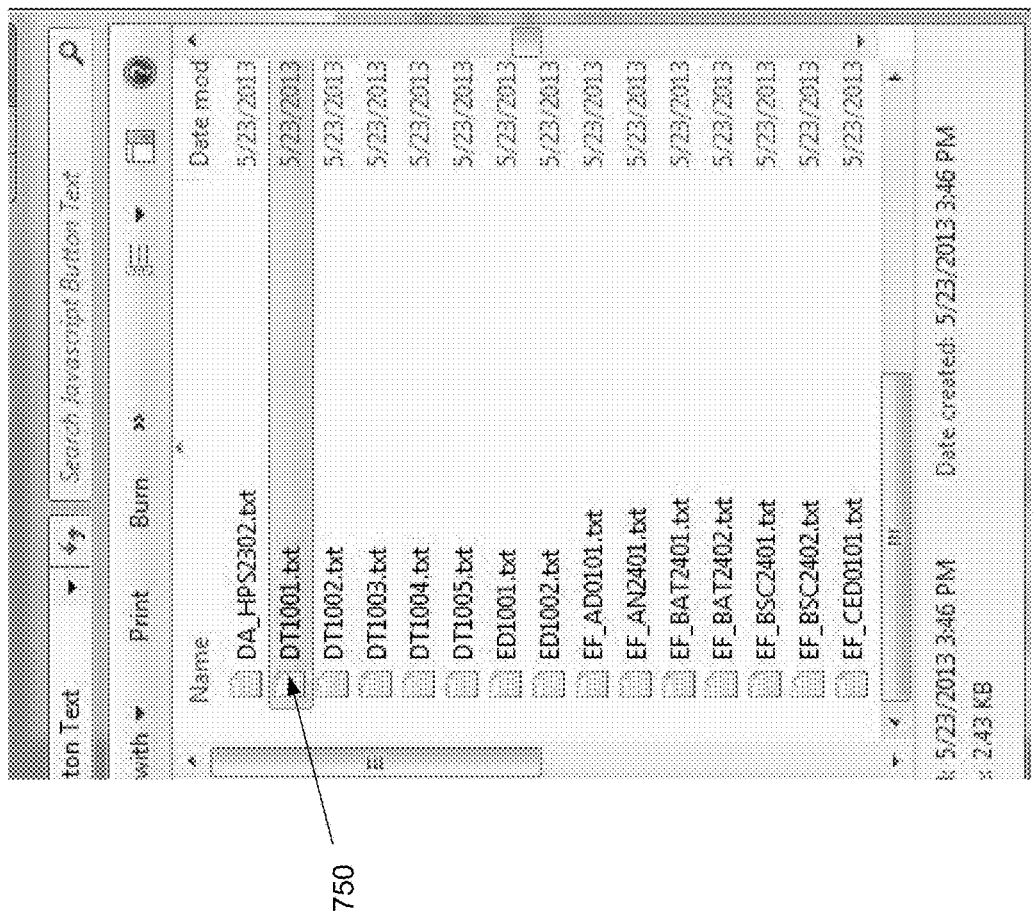
FIG. 21 shows an example of a folder with text files.

Phase 5 uses the object of interest spreadsheet file (as seen in FIG. 6) for each type, where all objects of interest have been associated with relevant document files (e.g., PDF document files), and the locations within those files. A macro program (such as a Visual Basic macro program) is executed on each of these type spreadsheet files, and generates a text file for each object of interest based on the information provided for that object (i.e., the information provided in that object's row), wherein the text in the file is in the form of code. In one embodiment, the macro program arranges the information from the spreadsheet row into a Javascript code format which can be placed into PDF files. Each text file is named after the unique identifier tag for its object of interest. The text files 750, each representing an object of interest with "pointers" to important locations within the original collection of PDF documents, may be collected in a single folder, as seen in FIG. 21. For example, the text file "DT1001.txt" 750 contains the Javascript which will be placed into relevant PDF files which have buttons or links with the "DT1001" tag (which corresponds to the "AHU-DT-10-01" air handling unit, as seen in FIG. 6). In this embodiment, the values in the column labeled "DEST" in FIG. 6 are used as the unique identifier tags for the corresponding objects shown in the first column.

In Phase 6, the code from the text files are injected into relevant PDF files 122. In one embodiment, all of the PDF documents analyzed in Phase 1, and all of the PDF menu files generated from Phase 4, are placed into a common folder for ease of processing. A Visual Basic script (or other similar program) then processes a PDF document by opening it, and collecting a list of buttons and links available in the PDF (these buttons and links were generated in Phase 1 for the collection of documents or in Phase 4 for the menus).

For each button or link, the process first determines whether the button or link is named after a document, or a unique identifier tag for an object (this is apparent by the button or link name). If the button/link is named after another document (e.g., "Air Handling Units.pdf"), the program generates a Javascript code for the button/link and inserts the code into the PDF document so that when the button/link is clicked (such as by an end-user), the code opens the document bearing the same name as the button/link. This is the case for all category PDF menus.

Figure 22:
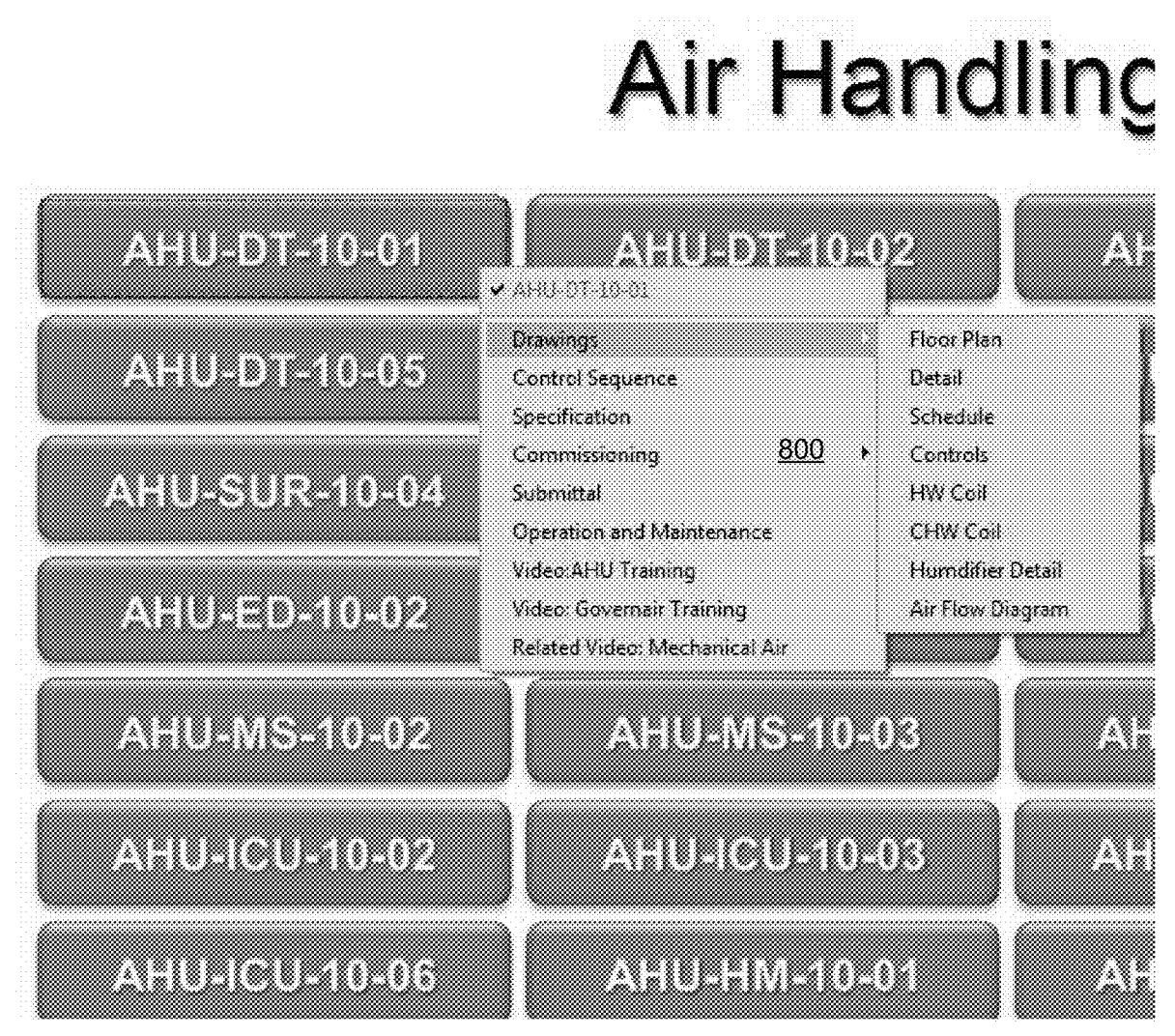

If the button/link is named after the unique identifier tag of an object of interest, the program searches the text files for a file name bearing the unique identifier tag. If a match is found, the text file is opened and the Javascript code is copied from it and placed within the PDF document. When a user clicks the button/link, a pop-up menu 800 is presented showing options that can guide the user to various destinations, as seen in FIG. 22. The unique identifier tags exist within both the PDF menus and the original PDF document files.

In the example shown in FIG. 22, the user has clicked on the button labeled "AHU-DT-01-01." The pop-up menu 800 generated by the imbedded Javascript code presents the type of information available for the unit. When user clicks on an option with the pop-up menu, the PDF containing the information is opened to the page based upon the destination provided (as determined in Phase 1). For example, if the user clicks on the submenu option "Floor Plan," the code opens the correct PDF document to the view shown in FIG. 4, providing the user with a floor plan view of "AHU-DT-10-01."

Figure 23:
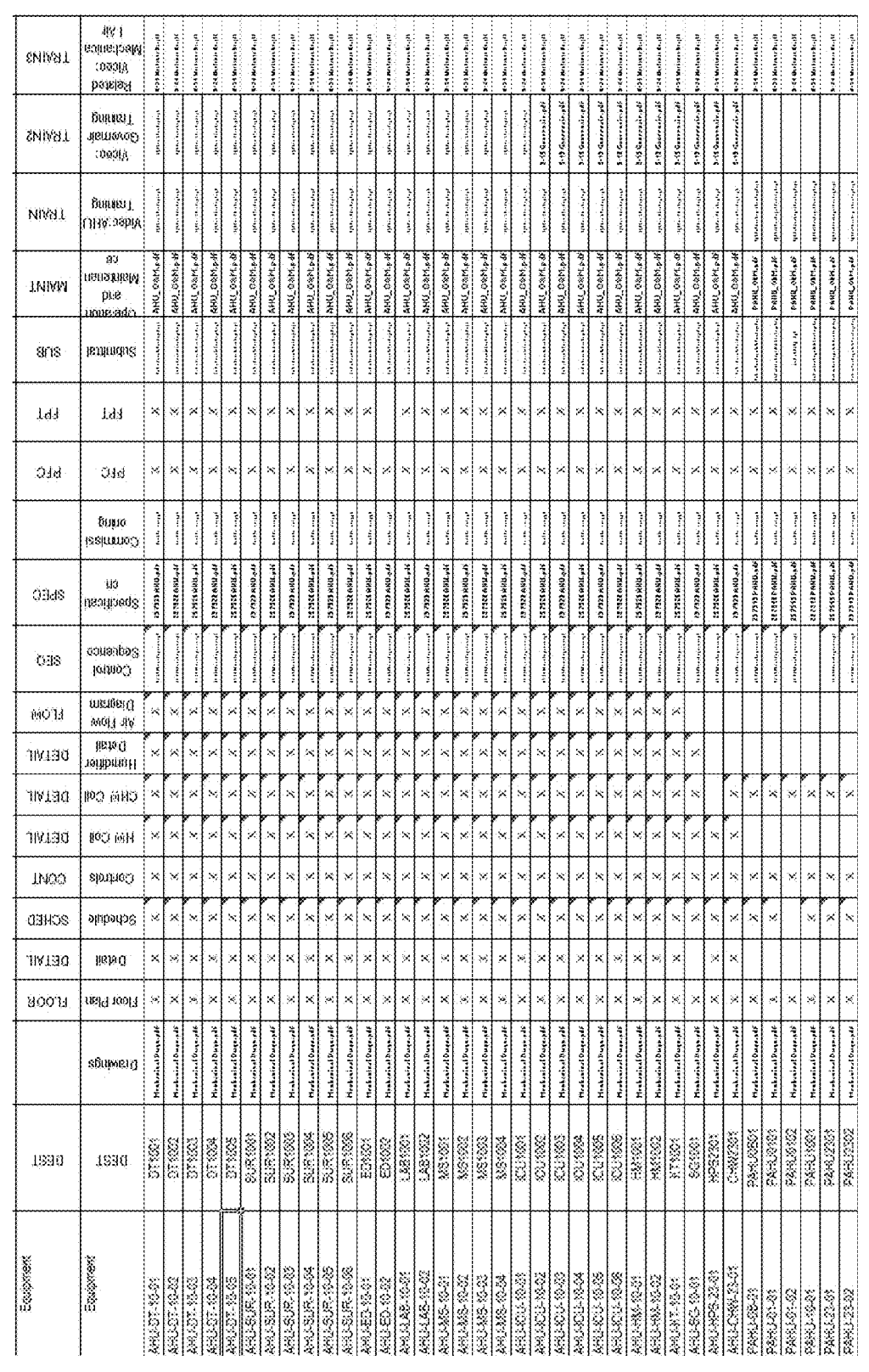

Phase 7 is a code-verification phase 124. In one embodiment, a Visual Basic script (or similar program) is executed on each PDF file. The program compiles a list of each filename as well as each button and destination within that file. It then opens each type spreadsheet representing each object of interest, and verifies that each data point shown on the spreadsheet is accurately associated with the buttons and destinations list collected from the PDFs. Any points which do not have a match are marked in some way (e.g., highlighted, or with a different color), for easy detection, as seen in FIG. 23. Mismatched points can then be corrected either in the spreadsheet or in the PDF documents by re-executing the appropriate steps in Phases 1 and 5.

The complete library of PDF documents and menus can then be stored on one or more single computer storage devices (e.g., external disk drive, computer hard drive, portable drive, USB drive, or the like), and provided to end-users. The end-user can initiate the menu file and proceed through the menus to find the information needed, then click on the appropriate link or button to go to that information in the original PDF document, wherever located.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for creating a collective index for a plurality of documents, comprising the steps of:
   converting each document in a plurality of documents to a document file in common standard format;
   identifying objects of interest, wherein objects of interest are not documents or sections of documents in said plurality of documents;
   creating a list of names for each identified object of interest;
   creating a single unique named object identifier tag for each named object of interest, wherein the single unique named object identifier tag does not identify any documents or sections of said documents in said plurality of documents;
   processing all of the document files in common standard format, wherein said processing comprises:
      searching each document to identify information pertinent to any identified object of interest, where the information has a type;
      marking, in each document, information pertinent to an identified named object of interest with a unique identifier tag, said unique identifier tag comprising a combination of a form of the unique named object identifier tag for the named object of interest, and the type of information identified;
      adding a destination to the document for that unique identifier tag; and overlaying the marked information within each document with a button;
   constructing a plurality of menu files with multiple category levels for said collective index, wherein each type of object of interest belongs to a low category level, and each object of interest corresponds to a button in a menu file; and
   inserting code text files into the document files and the plurality of menu files, wherein each code text file corresponds to the at least one of identified objects of interest, and comprises pointers to locations within the plurality of document files with information pertinent to the at least one of identified objects of interest, wherein the code text files inserted into the plurality of menu files cause one or more sub-menus to open in a window when a user clicks on a menu button for the particular identified object of interest, wherein the sub-menus present information options available for the particular identified object of interest, and cause the document file to open to the location for the selected information option.

2. The method of claim 1, wherein the plurality of documents come from a variety of sources in different formats.

3. The method of claim 1, wherein the plurality of documents initially comprise electronic documents, paper documents, or both.

4. The method of claim 1, wherein the all of the document files and menu files in common standard format are stored on a single computer-readable storage device.

5. The method of claim 4, wherein the storage device is a computer hard drive.

6. The method of claim 4, wherein the storage device is a USB drive.

7. The method of claim 1, further comprising verifying that each data point for an object of interest is accurately associated with the buttons and the destinations.

* * * * *